Aug. 4, 1953  J. E. NAFE, SR., ET AL  2,647,414
DUAL CONTROL ATTACHMENT FOR AUTOMOBILES
Filed June 20, 1950

James E. Nafe, Sr.
Claire C. Christy
INVENTORS

BY *Clarence A. O'Brien*
*and Harvey B. Jacobson*
Attorneys

Patented Aug. 4, 1953

2,647,414

UNITED STATES PATENT OFFICE 2,647,414

DUAL CONTROL ATTACHMENT FOR AUTOMOBILES

James E. Nafe, Sr., Charleston, W. Va., and Claire C. Christy, Pine Hill, N. J.; said Christy assignor to said Nafe Application June 20, 1950, Serial No. 169,092

1 Claim. (Cl. 74—479)

The present invention relates to new and useful improvements in dual control attachments for automobiles whereby an instructor teaching a person to drive an automobile may himself operate the clutch and brake pedals either in emergency, or for purposes of instruction.

An important object of the invention is to provide a novel attachment which may be easily and quickly applied to an automobile without necessitating any changes or alterations in the construction thereof and permitting easy removal of the device when no longer needed.

Another object of the invention is to provide dual clutch and brake pedal control means without interfering with the normal use of the regular pedals.

A still further object is to provide a device of this character of simple and practical construction, which is efficient and reliable in operation, relatively inexpensive to manufacture and otherwise well adapted to the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
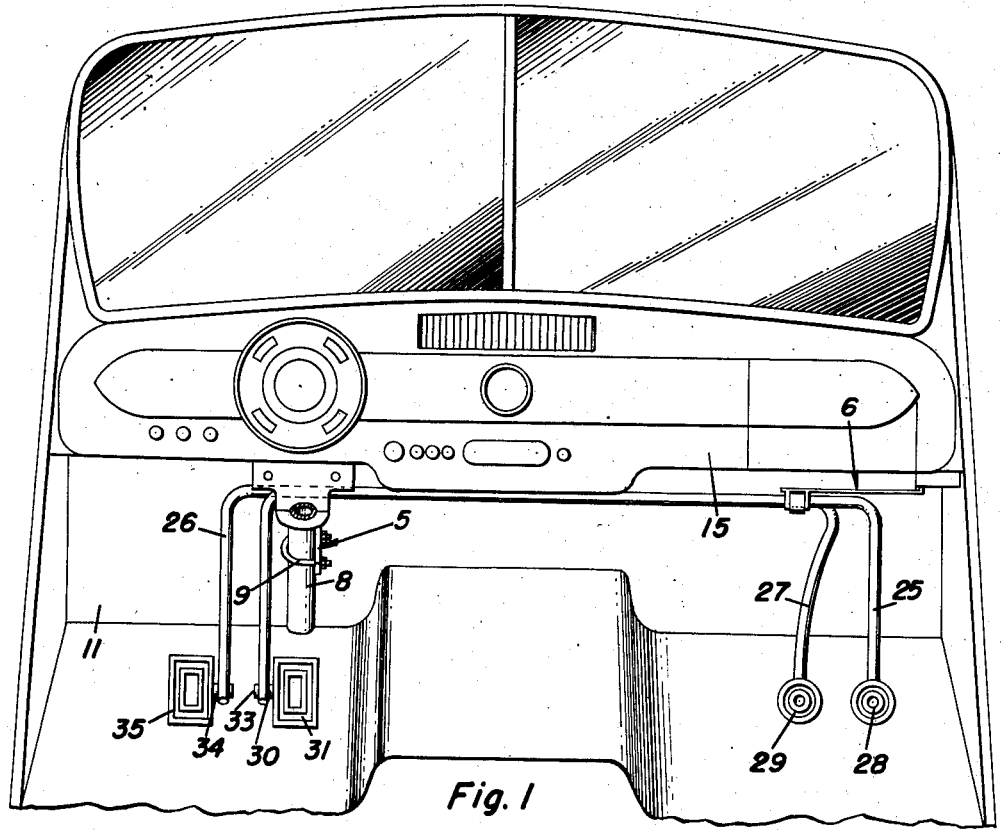
Figure 1 is a view in elevation showing the dual control attachment in position on an automobile.
Figure 2:
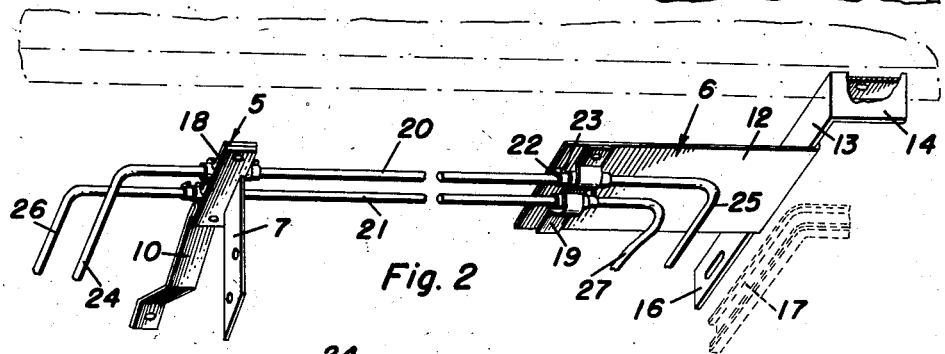
Figure 2 is a perspective view showing the attachment removed from the automobile.
Figure 3:
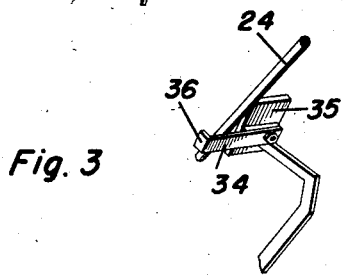
Figure 3 is a fragmentary perspective view showing one of the pedal attached arms or brackets for engagement by its manipulating rod.

Referring now to the drawing in detail wherein for the purpose of illustration we have disclosed a preferred embodiment of the invention the numeral 5 designates generally the left hand attaching bracket for the dual pedal control attachment and the numeral 6 designates generally the right hand attaching bracket.

Bracket 5 includes an arm 7 which is attached to the steering post 8 of an automobile by means of a U-bolt 9 and bracket 5 also includes an arm 10 which is attached to the fire wall 11 of the automobile.

Bracket 6 includes a horizontal plate 12 formed at one end with or suitably secured to an angular attaching plate 13 having one end 14 bolted or otherwise suitably secured to the under side of the instrument panel or dash lip 15 and with the other end 16 of attaching plate 13 secured to a body brace 17 of the automobile at the adjacent side thereof.

A bearing cap 18 is secured on top of bracket 5 and a bearing cap 19 is secured to the under side of bracket 6 and in which a pair of rods 20 and 21 are rockably mounted and held from endwise movement by collars 22 secured to the rods by set screws 23 and positioned at opposite sides of either or both bearing caps 18 and 19.

The ends of rod 20 are bent angularly as shown at 24 and 25 in parallel relation with respect to each other and the ends of rod 21 are similarly bent as shown at 26 and 27. A foot pedal 28 is suitably secured to the end of arm 25 and a foot pedal 29 is suitably secured to the end of arm 27.

Arm 24 of rod 20 rests loosely on a bracket 30 secured to the under side of brake pedal 31 by a bolt or nut 32, bracket 30 projecting laterally at the left hand side of brake pedal 31 and formed at its outer end with an upwardly projecting lip 33.

A bracket 34 constructed similar to bracket 30 is secured to the under side of clutch pedal 35 and projects laterally from the right hand side of the clutch pedal and on which the arm 26 loosely rests. The outer end of bracket 34 is also formed with an upstanding lip 36.

In the operation of the device the brackets 5 and 6 are attached to the automobile in the manner indicated and rods 20 and 21 are rockably supported by the brackets in a transverse position under the dash or instrument panel 15.

With the free ends of arms 24 and 26 loosely resting on brackets 30 and 34 of the brake and foot pedals 31 and 35 respectively and with pedals 28 and 29 positioned at the right hand side of the front seat of the automobile a depressing action subjected to pedal 28 will swing arms 25 and 24 downwardly to likewise depress the brake pedal 31 and a depressing action of pedal 29 will cause a similar movement of clutch pedal 35.

Brake pedal 31 and clutch pedal 35 may be depressed by the driver of the vehicle without affecting the operation of rods 24 and 26 or pedals 28 and 29.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In combination, an automobile foot pedal, a rod, means pivotally mounting said rod in the automobile in transverse relation to said foot pedal, an auxiliary foot pedal rigidly connected with one end of the rod to pivot said rod upon depression of the pedal, a side bracket on said first named pedal, an arm on the other end of said rod swingable forwardly upon pivoting of said rod in sliding engagement with said bracket, whereby depression of said auxiliary foot pedal will depress said first named pedal, said bracket lying forwardly of the arm to permit movement of the pedal away from said arm upon direct foot depression of said first named pedal.

JAMES E. NAFE, Sr.
CLAIRE C. CHRISTY.

References Cited in the file of this patent

UNITED STATES PATENTS

| Number | Name | Date |
|---|---|---|
| 1,051,446 | Preuss | Jan. 28, 1913 |
| 1,261,425 | Murphy | Apr. 2, 1918 |
| 1,941,516 | Sweet | Jan. 2, 1934 |
| 2,084,932 | Allen | June 22, 1937 |
| 2,166,978 | Stack | July 25, 1939 |
| 2,427,269 | Forssell | Sept. 9, 1947 |
| 2,524,486 | Snow | Oct. 3, 1950 |